Patented Jan. 12, 1926.

1,569,775

UNITED STATES PATENT OFFICE.

ALWIN MITTASCH, OF LUDWIGSHAFEN-ON-THE-RHINE, AND MATHIAS PIER, OF HEIDELBERG, GERMANY, ASSIGNORS TO BADISCHE-ANILIN- & SODA-FABRIK, OF LUDWIGSHAFEN-ON-THE-RHINE, GERMANY, A CORPORATION OF GERMANY.

SYNTHETIC MANUFACTURE OF METHANOL.

No Drawing. Application filed September 4, 1924. Serial No. 735,823.

*To all whom it may concern:*

Be it known that we, ALWIN MITTASCH and MATHIAS PIER, citizens of the German Empire, residing at Ludwigshafen-on-the-Rhine and Heidelberg, respectively, Germany, have invented new and useful Improvements in the Synthetic Manufacture of Methanol, of which the following is a specification.

Mixtures of carbon monoxid and hydrogen have repeatedly been exposed to the action of catalysts under conditions varying as to the nature of the catalysts and the temperature and pressure prevailing in the reaction with the result that methane or liquid hydrocarbons have been obtained in so far as a reaction could be effected at all.

We have now found that methanol can be obtained by the interaction of carbon monoxid and hydrogen at an elevated temperature and pressure and by the use of contact masses capable of causing the formation of methanol and higher alcohols by the said interaction, provided the interior of the contact space be kept completely free from iron. In order to carry out this invention, the contact masses must be free from iron, the inner surface of the walls of the reaction chamber must not consist of iron and the gases must not carry any iron, either in the form of fine particles or of volatile compounds of iron such as iron carbonyl. Provided the above conditions be observed, the other conditions may be varied within very wide limits. The nature of the contact masses may vary very considerably and the said masses may contain either metals or oxids or mixtures of more than one metal or more than one oxid or of metals or oxids. In addition to carbon monoxid and hydrogen, other inert gases may be present, the pressure being preferably from 50 atmospheres upwards and the temperature between say about 250 degrees and 600 degrees centigrade, depending on the efficiency of the contact mass in each individual case.

The methanol produced in accordance with this invention is either pure or mixed with higher alcohols and other organic compounds containing oxygen, depending on the special conditions of working employed.

The following example will serve to illustrate one manner of carrying the invention into effect without limiting the invention to this example. The parts are by weight.

A tube capable of resisting high pressure is lined inside with copper and provided with a granular contact mass composed of equal molecular proportions of chromium oxid and manganese oxid, and heated to 450 degrees centigrade. A gas mixture containing about 80 per cent, by volume, of hydrogen and 20 per cent, by volume, of carbon monoxid which has been carefully freed from any volatile iron compounds and suspended iron particles, is then passed through the said tube at a pressure of about 220 atmospheres while maintaining the temperature at 450 degrees centigrade. The reaction gas is led through a cooler without releasing the pressure, when ample quantities of methanol will separate out. The residual gas may be led back into the tube after adding a fresh quantity of gas mixture.

With other contact masses, for example such as are composed of copper and chromium oxid, or the oxids of zinc and chromium, the result is very similar. Under other conditions, for example with a contact mass containing besides difficultly reducible metal oxids a small addition of potassium carbonate and preferably with a higher percentage of carbon monoxid and a reduced velocity of the gas current, higher alcohols such as propyl, butyl and amyl alcohols are formed besides methanol, the proportions varying according to the exact conditions, especially the temperature employed.

Contact masses containing oxids of vanadium, uranium, aluminium or other oxids non-reducible under the conditions of working may also be employed, or metals such as copper, silver, lead, zinc in conjunction with a metal oxid or a metal salt acting as a promoter especially derived from a metal belonging to the fourth to the seventh groups of the periodic system, or metal alloys for example chromium and manganese, copper and zinc and others.

What we claim is:

1. In the process of manufacturing methanol by the interaction of carbon monoxid and hydrogen in the presence of a catalyst capable of causing the formation of methanol by the said interaction, the step of completely excluding iron from the reaction.

2. The process of manufacturing methanol by the interaction of carbon monoxid and hydrogen in the presence of a catalyst capable of causing the formation of methanol by the said interaction, which consists in employing a catalyst which is free from iron and a non-ferrous inner wall of the contact space and a gas mixture which is completely free from either suspended or vaporized iron.

3. The process of manufacturing methanol by the interaction of carbon monoxid and hydrogen in the presence of a catalyst capable of causing the formation of methanol by the said interaction and at a pressure of more than 50 atmospheres and a temperature of between about 250 degrees and 600 degrees centigrade which consists in employing a catalyst which is free from iron and a non-ferrous inner wall of the contact space and a gas mixture which is completely free from either suspended or vaporized iron.

In testimony whereof we have hereunto set our hands.

ALWIN MITTASCH.
MATHIAS PIER.